US012590654B2

(12) United States Patent
Harshmann

(10) Patent No.: US 12,590,654 B2
(45) Date of Patent: Mar. 31, 2026

(54) NESTLED HOSE

(71) Applicant: Treadstone Innovations, LLC, Loma, CO (US)

(72) Inventor: Joshua P. Harshmann, Loma, CO (US)

(73) Assignee: Treadstone Innovations, LLC, Loma, CO (US)

( * ) Notice: Subject to any disclaimer, the term of this patent is extended or adjusted under 35 U.S.C. 154(b) by 0 days.

(21) Appl. No.: 19/057,645

(22) Filed: Feb. 19, 2025

(65) Prior Publication Data

US 2025/0354636 A1 Nov. 20, 2025

Related U.S. Application Data

(63) Continuation of application No. 18/665,831, filed on May 16, 2024.

(51) Int. Cl.
| | |
|---|---|
| F16L 11/20 | (2006.01) |
| F16L 11/04 | (2006.01) |

(52) U.S. Cl.
CPC ............... F16L 11/20 (2013.01); F16L 11/04 (2013.01)

(58) Field of Classification Search
CPC .................................. F16L 11/20; F16L 11/04
USPC ........................................................ 138/114
See application file for complete search history.

(56) References Cited

U.S. PATENT DOCUMENTS

| | | | |
|---|---|---|---|
| 5,758,690 A | 6/1998 | Humpert et al. | |
| 5,931,184 A | * 8/1999 | Armenia | A47L 15/421 |
| | | | 285/123.1 |

| | | | |
|---|---|---|---|
| 6,129,107 A | * 10/2000 | Jackson | F16L 55/17 |
| | | | 138/104 |
| 6,446,661 B2 | * 9/2002 | Armenia | F16L 39/02 |
| | | | 285/123.1 |
| 6,546,951 B1 | * 4/2003 | Armenia | D06F 39/088 |
| | | | 285/123.1 |
| 2010/0175772 A1 | 7/2010 | Knotten | |
| 2012/0234425 A1 | * 9/2012 | Berardi | F16L 11/20 |
| | | | 138/137 |
| 2013/0087205 A1 | * 4/2013 | Berardi | F16L 11/00 |
| | | | 138/40 |
| 2015/0041016 A1 | 2/2015 | Ragner | |

(Continued)

FOREIGN PATENT DOCUMENTS

EP 0290067 A2 11/1988

OTHER PUBLICATIONS

ISA, "International Search Report and Written Opinion" issued for International Patent Application No. PCT/US2025/029614, dated Oct. 3, 2025, 14 pages.

*Primary Examiner* — David R Deal
(74) *Attorney, Agent, or Firm* — NOD Law PC

(57) ABSTRACT

The disclosure outlines a hose system and method for coupling hoses. The system includes an inner hose surrounded by an outer hose, coupled by a coupling device. In some embodiments, the coupling device and outer hose form a containment assembly for the inner hose. In some embodiments, hoses are flexible and can connect to fluid sources. In some embodiments, clamps can further secure the hoses to the coupling device. The disclosure includes methods of coupling hoses, including by using a pulling device to thread the inner hose through the outer hose. In some embodiments, the coupling method involves attaching the hoses to different parts of a coupling device, potentially utilizing a seat.

9 Claims, 6 Drawing Sheets

505

(56) References Cited

U.S. PATENT DOCUMENTS

| | | | |
|---|---|---|---|
| 2015/0354731 A1* | 12/2015 | Ragner | .................. F16L 57/06 |
| | | | 138/119 |
| 2017/0363236 A1 | 12/2017 | Rose et al. | |
| 2019/0038098 A1 | 2/2019 | Thorne et al. | |
| 2023/0383871 A1* | 11/2023 | Berardi | .................. F16L 33/01 |
| 2024/0117899 A1* | 4/2024 | Salerno | ............. B60G 17/0155 |

* cited by examiner

212

208

204

206

102

510

505

600

NESTLED HOSE

CLAIM OF PRIORITY UNDER 35 U.S.C. § 120

The present Application for Patent is a Continuation of patent application Ser. No. 18/665,831 entitled "NESTLED HOSE", filed May 16, 2024, and assigned to the assignee hereof and hereby expressly incorporated by reference herein.

FIELD OF THE DISCLOSURE

The present disclosure relates generally to hoses for transporting pressurized fluids or other materials. In particular, but not by way of limitation, the present disclosure relates to systems, methods and apparatuses for insulating hoses to minimize leaks.

DESCRIPTION OF RELATED ART

Extendable and retractable hoses provide many benefits, in that they can be more easily manipulated and transported to various job sites. However, current retractable and extendable hoses use fiber woven covers that are difficult to handle in different environments, such as dirt, cold and rain. The woven covers additionally tend to easily wear or fray when exposed to the elements, rocks, or other rough surfaces. In addition, the dichotomy between the outer cover and the inner hose can lead to leaks, breakages and snags. That is, the bends or fraying in the woven covers can cause leaks, breakages and snags with the inner hose, making extending or retracting difficulty, or hindering the performance of the interior hose. As such, there is a need for a hose design that is retractable and extendable, but that does not have an outer cover that wears easily or causes issues with the interior hose.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a hose system comprising: an inner hose; an outer hose substantially surrounding the inner hose; and a coupling device configured to couple a first end of the inner hose and a first end of the outer hose. In some embodiments, the inner hose and outer hose comprise materials selected from at least one of natural rubber, synthetic rubber, High-Density Polyethylene (HDPE), neoprene, butyl, polyvinyl chloride, polyurethane, PTFE, silicone, stainless steel, nylon, polyethylene, composite materials, metals, thermoplastics, fluorinated ethylene propylene, polyester, aramid, cotton, steel wire, carbon fiber, and nomex. In some embodiments, the coupling device comprises one or more threads configured to removably couple the inner hose and the outer hose to the coupling device. In many embodiments, the inner hose and outer hose are bendable and retractable. In various embodiments, the second ends of the inner hose and the outer hose are configured to couple to a hose fitting for connection to a fluid source. In many embodiments, the coupling device comprises a material selected from the group consisting of metal, plastic, thermoplastic, composite material, rubber, and PVC. In other embodiments, the hose system further comprises one or more clamps configured to further couple the inner hose and the outer hose to the coupling device. In some embodiments, the outer hose has a diameter larger than that of the inner hose. In various embodiments, the coupling device comprises a seat on which the first end of the inner hose sits upon after coupling. In many embodiments, the hose system complies with regulations requiring secondary containment areas to have a volume at least 110% of a largest tank.

Other embodiments of the disclosure may also be characterized as a method for coupling hoses in a hose system, comprising: removably attaching a pulling device to a first end of an inner hose; pulling the inner hose through an outer hose; detaching the pulling device from the first end of the inner hose; and coupling a first end of the inner hose to a first portion of a coupling device and coupling a first end of the outer hose to a second portion of the coupling device. In some embodiments, the method further comprises filling the inner hose with air, foam, gas, or fluid to increase its volume and facilitate pulling the inner hose through the outer hose. In many embodiments, coupling the first end of the inner hose to the first portion of the coupling device and coupling the first end of the outer hose to the second portion of the coupling device comprises coupling a first end of the inner hose to a seat of the coupling device. In some embodiments, the method further comprises clamping, by way of one or more clamps, the inner hose and the outer hose to the coupling device. In various embodiments, the method further comprises manufacturing the inner hose within the outer hose.

Other embodiments may be described as a coupling device for hoses, comprising: an outer tube configured to removably couple a first end of an outer hose onto the coupling device; an inner tube configured to removably couple a first end of an inner hose onto the coupling device; and wherein the outer tube and the inner tube are concentric and made as a unitary device, and wherein the unitary device comprises a seat between the inner tube and the outer tube. In some embodiments, the inner tube and the outer tube are configured with threads for threading engagement with the first end of the outer hose and the first end of the inner hose. In many embodiments, the inner tube and the outer tube are configured to removably couple with the outer hose and the inner hose by way of one of a quick-connect coupling, push-fit connectors, barbed fittings, bayonet connectors, camlock couplings, compression fittings, magnetic connectors, and adaptors. In some embodiments, the coupling device comprises one of metal, plastic, thermoplastic, composite material, rubber, and PVC. In various embodiments, the coupling device further comprises one or more clamps configured to further couple the inner hose and outer hose to the coupling device.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
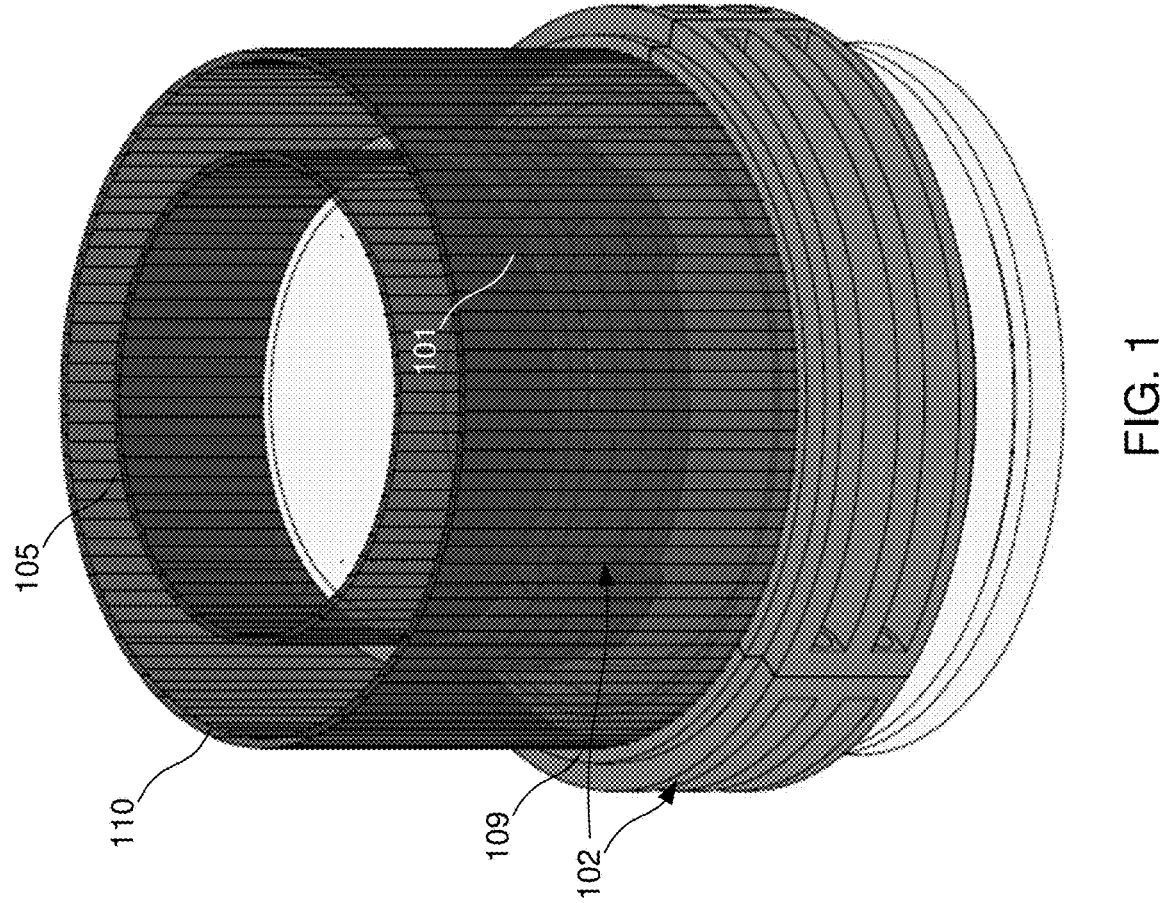
FIG. 1 is a perspective view of a hose coupling in accordance with an embodiment of the present invention.
Figure 1:
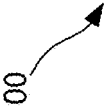

Prior to describing the embodiments in detail, it is expedient to define terms as used in this document. For the purpose of this document, relational terms such as, without limitation, "lateral", "longitudinal", "perpendicular", "parallel", and "flat" shall be understood to mean "within reasonable manufacturing tolerances accepted in the hose manufacturing industry". The term "longitudinal" shall reference that direction associated with a typical direction of travel or intended travel of a substance within the interior of a hose. The term "lateral" may reference any direction that is not longitudinal. The term "exterior" shall reference that region intended to interface with an outside of a hose, while the term "interior" shall reference that region within a hose. The term "nonlinear" shall be understood to mean having a curved region.

The word "exemplary" is used herein to mean "serving as an example, instance, or illustration." Any embodiment described herein as "exemplary" is not necessarily to be construed as preferred or advantageous over other embodiments.

The flowcharts and block diagrams in the following Figures illustrate the functionality and operation of possible implementations of a hose within a hose according to various embodiments of the present disclosure. It should be noted that, in some alternative implementations, the functions noted in each block may occur out of the order noted in the figures. For example, two blocks shown in succession may, in fact, be executed substantially concurrently, or the blocks may sometimes be executed in the reverse order, depending upon the functionality involved.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The hose may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups but do not preclude the presence or addition of one or more other features, integers, steps, operations, elements, components, and/or groups thereof. As used herein, the term "and/or" includes any and all combinations of one or more of the associated listed items and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is an exemplary embodiment of a hose system 100 with a coupling device 102. The hose system 100 comprises an inner hose 105 and an outer hose 110 (both shown in a cut-off format). In many embodiments, inner hose 105 and/or outer hose 110 may comprise a natural or synthetic rubber compound (such as ethylene propylene diene monomer,) nitrile, High-Density Polyethylene (HDPE), neoprene, butlyl, polyvinyl chloride, polyurethane, PTFE, silicone, stainless steel, nylon, polyethylene, composite materials (such as, for example, rubber and fiberglass), metals, thermoplastics, fluorinated ethylene propylene, polyester, aramid, cotton, steel wire, carbon fiber, nomex, thermoplastic vulcanizate, and the like. In some embodiments, inner hose 105 and outer hose 110 comprise the same material, and in other embodiments, inner hose 105 and outer hose 110 comprise different materials from one another. In many embodiments, inner hose 105 and outer hose 110 are configured as bendable and retractable hoses. In some embodiments, inner hose 105 and/or outer hose 110 are configured with a reinforcement layer. In many embodiments, inner hose 105 and/or outer hose 110 comprise a relatively flexible material to support bending and retraction.

In many embodiments, hoses 105, 110 are configured as long, tubular bodies having differing diameters. In some embodiments, this enables a containment assembly for the inner hose, where the outer hose 110 and the coupling device 102 prevent a leak in the inner hose 105 from escaping the containment assembly. For example, in some embodiments, hose 105 has a diameter of 8-16 inches and hose 110 has a diameter of 12-20 inches. In such embodiments, inner hose 105 has a diameter smaller than that of outer hose 110. In many embodiments, the coupling of inner hose 105 within outer hose 110 allows the hose system to comply with regulations requiring secondary containment areas in aboveground tanks to have a volume at least 100%, 110% or even higher percentage of the size of the largest tank. That is, in many embodiments, the combination of the interior volume of inner hose 105, with the remaining interior of outer hose 110 (in embodiments, where the inner hose 105 is nestled within outer hose 110), allows the hose system to comply with regulations requiring secondary containment areas in aboveground tanks to have a volume at least 100%, 110% or even higher percentage of the size of the largest tank.

In many embodiments, hoses 105, 110 may be used for various industrial and/or household applications. For example, to transfer fluids such as water, gasoline, liquid/liquefied/gaseous chemicals, petrochemicals, solutions, sewage, and natural gas.

In various embodiments, inner hose 105 is configured to reside within outer hose 110, such that outer hose substantially surrounds inner hose 105. In many embodiments, coupling device 102 facilitates coupling a first end 101 of the inner hose 105 and a first end 109 of the outer hose 110.

Figure 2:
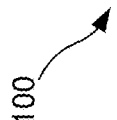
FIG. 2 is a sectional view of a hose coupling in accordance with an embodiment of the present invention.

For example, with reference to an embodiment illustrated in FIG. 2, coupling device 102 comprises one or more outer threads 206 and one or more inner threads 202. A threaded end of inner hose 105 is configured to removably thread onto coupling device 102 using the one or more inner threads 202. In some embodiments, a threaded end of an outer hose 110 is configured to removably thread onto coupling device 102 using the one or more outer threads 206. In some embodiments, coupling device 102 is configured without threads, such that outer hose 110 and inner hose 105 removably couple to coupling device 102 in other manners, for example, by quick-connect couplings, push-fit connectors, barbed fittings, bayonet connectors, camlock couplings, compression fittings, magnetic connectors, grooved couplings, Storz couplings/adaptors, and other threadless attachments known in the art.

In some embodiments, the second ends (not shown) of hoses 105, 110 may couple to one or more hose fittings to further couple to a fluid source, such as a faucet, a drain, a dispenser, another conduit or hose, or any other similar device. In many embodiments, the second ends of hoses 105, 110 are configured with complementary hose fittings (not shown) to those of a fluid source, such as a water faucet, a fluid drain, a fluid dispenser, or even another flexible or rigid hose or conduit. In other embodiments, the second ends of hoses 105, 110 do not couple with any hose fittings. Typically the second end of the inner hose 105 will couple to the fluid source while the outer hose 110 will be blocked from the fluid source, thereby creating a confined containment volume between the inner and outer hoses 105, 110.

In various embodiments, coupling device 102 comprises a metal (such as brass, aluminum, steel, or the like), a plastic (such as polypropylene, nylon, etc.), a thermoplastic, a composite material, a rubber, PVC and the like.

Figure 3:
FIG. 3 is an interior view of a hose coupling in accordance with an embodiment of the present invention.
Figure 4:
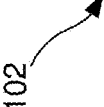
FIG. 4 is a perspective view of a hose coupling in accordance with an embodiment of the present invention.

In some embodiments, and with reference to FIGS. 3 and 4, coupling device 102 is configured with concentric tubes, wherein a smaller tube, 204 is coupled to and/or made unitary with a larger tube 206. In some embodiments, coupling device 102 has one or more grooves 212 on the exterior portion of each tube 204, 206. In some embodiments, the groves facilitate affixing first ends of hoses 105, 110 into tubes 204, 206. In many embodiments, coupling device 102 comprises a seat 208, on which an end of the inner hose 105 sits upon after coupling.

Figure 5B:
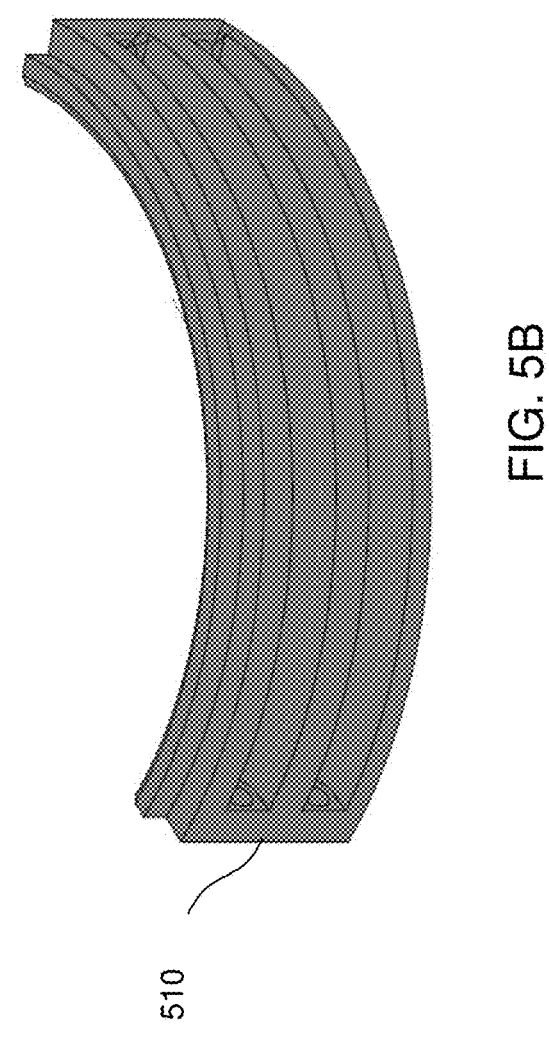
FIG. 5B is a perspective view of a clamp portion in accordance with an embodiment of the present invention.
Figure 5A:
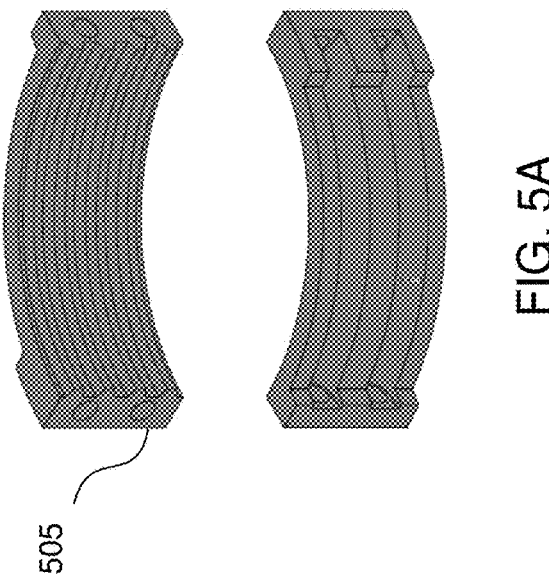
FIG. 5A is a perspective view of clamp portions in accordance with an embodiment of the present invention.

In some embodiments, one or more additional features may be used to couple inner hose 105 and external hose 110 to the coupling device 102. For example, with reference to FIGS. 5A and 5B, one or more clamps 505, 510 are used to further couple inner hose 105 and outer hose 110 to coupling device 102. For example, in some embodiments, an inner hose clamp 505 is configured to clamp inner hose 105 to coupling device 102 and an outer hose clamp 510 is configured to clamp outer hose 110 to coupling device 102.

In some embodiments, inner hose clamp 505 and/or outer hose clamp 510 comprise one or more removable sections. In some embodiments, inner hose clamp 505 comprises two or more removable sections and outer hose clamp 510 comprises three sections (only one shown) that couple to one another. In some embodiments, the sections couple to one another by bolts and nuts, quick release latches, snap-on or push-button mechanisms, interlocking tabs or notches, threaded connections, hinged joints, by bayonet connections, cam locks, slide-and-lock mechanisms, tongue-and-groove connections or the like. In other embodiments, clamps 505 and/or 510 comprise Victaulic clamps.

In other embodiments, the inner hose 105 and/or outer hose 110 can be crimped onto the coupling device 102. For example, in some embodiments, a crimping process for securing a hose onto a fitting begins with selecting the appropriate fitting that matches the size and type of the hoses 105, 110. The fittings can include barbed fittings, threaded fittings, quick-connect couplings, compression fittings, cam-lock couplings, push-to-connect fittings, flanged fittings, bayonet couplings, grooved couplings, and/or the like. Next, the first ends of hose 105 and hose 110 are prepared by cleaning and trimming squarely. The fitting is then inserted into the first end of the hose 105 and/or 110 until it reaches the desired position. Using a hydraulic or manual crimping tool designed for hose crimping, pressure is applied to compress a metal sleeve or ferrule around the hose 105 and/or 110 and fitting. This compression deforms the sleeve, creating a tight seal between the hose 105 and/or 110 and fitting. After crimping, a visual inspection and/or a pressure test may be conducted to verify the integrity of the connection.

In other embodiments, coupling device 102 comprises a Storz coupling to couple the inner hose 105 into the outer hose 110. For example, a first half of the Storz coupling can be affixed to a first end of hose 105 and the second half of the Storz coupling can be affixed to a first end of hose 110.

The two halves of the Storz coupling can then be aligned and interlocked by inserting the first half into the second half and twisting securely.

In many embodiments, gaskets, o-rings, ferrules, sealant tape and the like can be coupled to coupling device 102 and/or hoses 105, 110 to minimize and/or prevent leaks.

Figure 6:
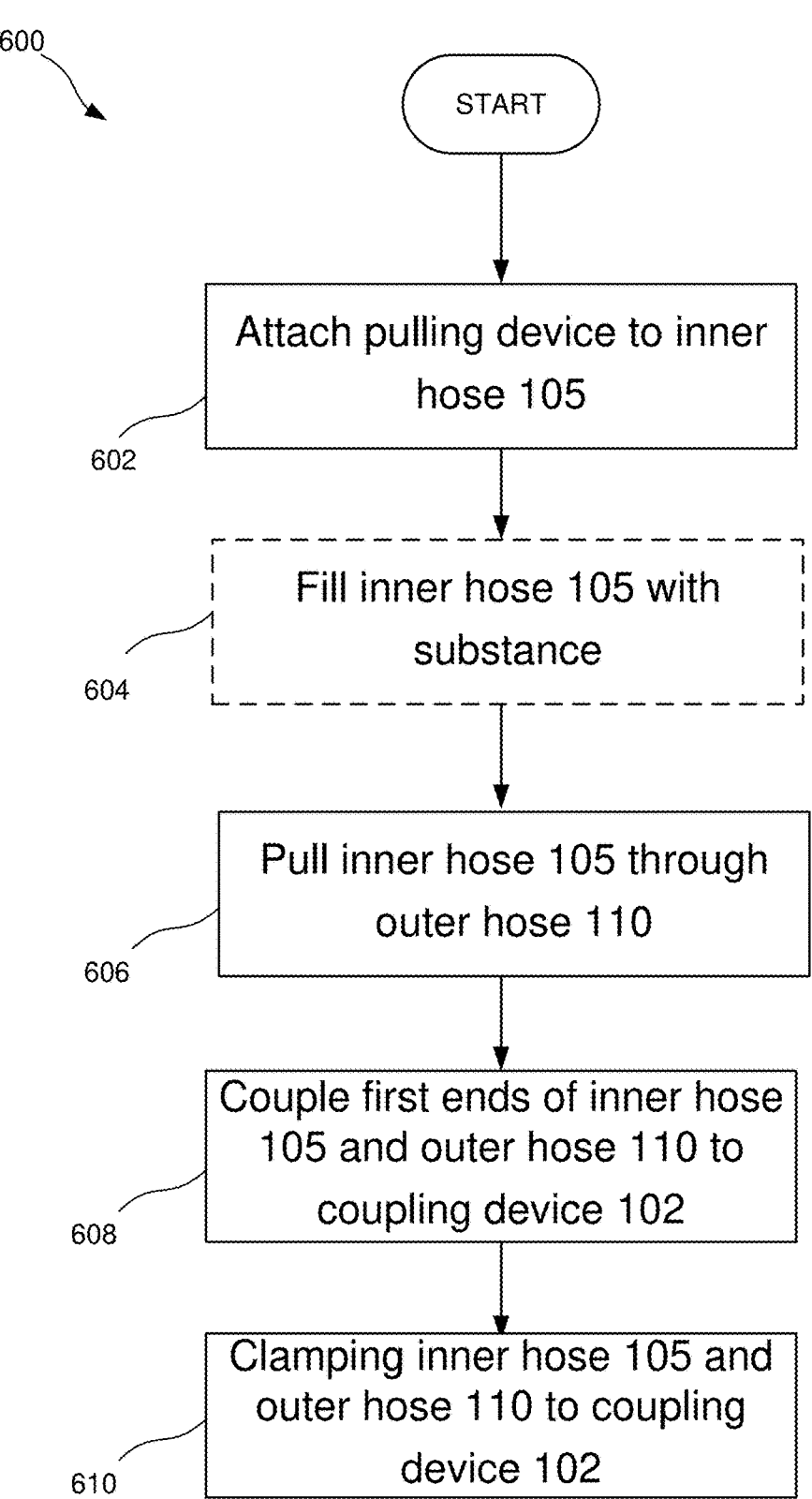
FIG. 6 is a flowchart of a method for coupling two hoses in accordance with an embodiment of the present invention.

With further reference to FIG. 6, various methods of coupling the inner hose 105 into outer hose 110 are provided. For example, in some embodiments, a rope, cable, or chain or similar feature is pushed or threaded through the outer hose 110 (step 602) until it attaches to the inner hose 105, enabling the inner hose 105 to be pulled through the outer hose 110 by the rope (step 606). This technique utilizes the flexibility and strength of the rope, cable, or chain to navigate through the outer hose 110, facilitating the insertion of the inner hose 105.

In some embodiments, the inner hose 105 can be filled with air, foam, gas, or fluid to increase its volume and facilitate pushing it through the outer hose 110 (step 604). By pressurizing the inner hose 105, it becomes more rigid and easier to maneuver through the outer hose 110, allowing for efficient threading without compromising the integrity of the hoses.

In some embodiments, mechanical pushing or pulling devices can also be employed to thread the inner hose 105 into the outer hose 110. These devices provide controlled and precise movement, ensuring the inner hose 105 is properly inserted without causing damage to either hose. Additionally, mechanical devices can be used to push or pull the outer hose 110 over the inner hose 105, depending on the specific requirements of the application. In many embodiments, once the mechanical pushing or pulling devices have successfully threaded the inner hose 105 into the outer hose 110, they may be detached from the inner hose 105.

In some embodiments, manual pushing or pulling may be sufficient to thread the inner hose 105 into the outer hose 110. By hand, individuals can exert the necessary force to push the inner hose 105 through the outer hose 110 or vice versa. This method is particularly useful for smaller diameter hoses or when access to mechanical equipment is limited.

In other embodiments, an object to tie a rope, cable, chain, wire, foam swap or tape is pushed or pulled through the outer hose 110 using compressed air or gas. Once the object reaches the desired location, the rope, cable, chain, wire, or tape is attached to the inner hose 105, allowing it to be pulled through the outer hose. This technique combines the benefits of mechanical assistance with the versatility of manual manipulation, offering a comprehensive solution for threading hoses.

In many embodiments, once the inner hose 105 is substantially threaded within outer hose 110, the two hoses 105, 110 can each couple to coupling device 102 (step 608). That is, a first end 101 of inner hose 105 can couple to coupling device 102. For example, in some embodiments and with reference to FIGS. 1 and 4, the first end 101 of inner hose 105 couples to inner tube 204 of coupling device 102. In some embodiments, the first end 101 of inner hose 105 couples to inner tube 204 by way of screwing the threads of the first end 101 onto the threads 212 of tube 204. In such embodiments, the top of first end 101 of inner hose 105 abuts against the seat 208 of coupling device 102. However, other methods of coupling the inner hose to the coupling device 102 are contemplated and disclosed herein.

In many embodiments, a first end 109 of outer hose 110 can also couple to coupling device 102. For example, in some embodiments and with reference to FIGS. 1 and 4, the first end 109 of outer hose 110 couples to outer tube 206 of coupling device 102. In some embodiments, the first end 109 of outer hose 110 couples to inner tube 206 by way of screwing the threads of the first end 109 onto the threads 212 of tube 206. However, other methods of coupling the inner hose to the coupling device 102 are contemplated and disclosed herein.

In some embodiments, methods of coupling the inner hose 105 into outer hose 110 further include clamping, by way of one or more clamps (i.e., such as clamps 505 and/or 510), the inner hose 105 and the outer hose 110 to the coupling device 102 (step 610).

While the method illustrated in FIG. 6 illustrates five steps, various steps can be eliminated in various embodiments, and or additional steps may be added. For example, in some embodiments, step 604 is optional. In other embodiments, steps 602-606 can be replaced by a step of manufacturing the inner hose within the outer hose. For example, by integrating the coupling process into the manufacturing process, the inner hose 105 is seamlessly threaded into the outer hose 110, eliminating the need for additional threading methods post-manufacture. This streamlined approach enhances efficiency and reduces assembly time.

In other embodiments still, steps 602-606 can be replaced by twisting the inner hose 105 through the outer hose 110. That is, in various embodiments, inner hose 105 can be twisted to build rigidity and to aid in threading inner hose 105 through the outer hose 110. Whether done mechanically, using specialized equipment, or by hand, twisting the inner hose 105 enhances its structural integrity, making it easier to push or pull through the outer hose 110. This technique is especially effective for longer spans in the outer hose 110 or when navigating tight bends.

Further still, various methodologies described herein can be combined to thread or pull the inner hose 105 through outer hose 110. For example, in some embodiments, a pulling device can be attached to inner hose 105 and inner hose 105 can be both twisted and pulled through outer hose 110. In addition, or in other embodiments, inner hose 105 can be inflated or filled with a substance to further aide in threading it through outer hose 110.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms-even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a "protrusion" should be understood to encompass disclosure of the act of "protruding"—whether explicitly discussed or not—and, conversely, were there only disclosure of the act of "protruding", such a disclosure should be understood to encompass disclosure of a "protrusion". Such changes and alternative terms are to be understood to be explicitly included in the description.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for coupling hoses in a hose system, comprising:

removably attaching a pulling device selected from a rope, a cable, a chain, or a mechanical pulling tool to a first end of an inner hose;

pulling the inner hose through an outer hose;

detaching the pulling device from the first end of the inner hose; and coupling a first end of the inner hose to a first portion of a coupling device and coupling a first end of the outer hose to a second portion of the coupling device; wherein the outer hose and the coupling device cooperate to form a leak containment volume configured to capture and contain fluid leakage from the inner hose.

2. The method of claim 1, further comprising filling the inner hose with air, foam, gas, or fluid to increase its volume and facilitate pulling the inner hose through the outer hose.

3. The method of claim 1, wherein coupling the first end of the inner hose to the first portion of the coupling device and coupling the first end of the outer hose to the second portion of the coupling device comprises coupling a first end of the inner hose to a seat of the coupling device.

4. The method of claim 3, wherein the seat of the coupling device is disposed between concentric inner and outer tubes of the coupling device.

5. The method of claim 3, wherein the seat of the coupling device forms a containment boundary configured to capture leaked fluid from the inner hose.

6. The method of claim 1, further comprising clamping, by way of one or more clamps, the inner hose and the outer hose to the coupling device.

7. The method of claim 6, wherein the inner hose and the outer hose are secured by separate clamps configured to independently clamp the inner hose and the outer hose to the coupling device.

8. The method of claim 6, wherein the one or more clamps comprise two or more removable sections.

9. The method of claim 1, further comprising manufacturing the inner hose within the outer hose.

* * * * *